United States Patent Office 3,317,506
Patented May 2, 1967

---

3,317,506
PREPARATION OF SODIUM OR POTASSIUM SALTS OF POLYMYXIN B AND E OR COLISTIN FORMALDEHYDE - BISULFITE REACTION PRODUCTS
Samuel Wilkinson, London, England, assignor to Burroughs Wellcome & Co. (U.S.A.) Inc., Tuckahoe, N.Y., a corporation of New York
No Drawing. Filed Dec. 4, 1963, Ser. No. 328,049
Claims priority, application Great Britain, Dec. 13, 1962, 47,190/62
6 Claims. (Cl. 260—112.5)

This invention relates to sulphomethyl-polymyxins and their production.

The polymyxins are a group of basic polypeptide antibiotics active against Gram-negative bacteria. Polymyxin B and polymyxin E (known also as colistin) are the preferred polymyxins for chemotherapeutic use. In this specification the term polymyxin will be used to denote both polymyxin B and E.

By injection, these polymyxins cause pain and undesirable local effects at the side of injection. For the systemic treatment of bacterial infections, therefore, it is proposed to use sulphomethyl-polymyxins with which the pain and local effects on injection are negligible. A sulphomethyl-polymyxin is a derivative of a polymyxin in which amino groups $NH_2$ in the polypeptide have been converted into anionic sulphomethyl-amino groups $$NH.CH_2SO_3^-$$

by treating an aqueous solution of a salt (such as sulphate or hydrochloride) of the polymyxin with formaldehyde and aqueous alkali, and bringing the precipitated polymyxin formaldehyde derivative into solution by reaction with a solution of a bisulphite. Sulphomethyl-polymyxins, prepared respectively from polymyxin D, from polymyxins A, B and E, and from colistin have been described in United States patent specifications 2,599,950 and 3,044,934 and Japanese patent specification 4898/57.

It has now been found that sulphomethyl-polymyxins having widely different toxicities and antibacterial activities can be produced from a given polymyxin by small variations in the reaction conditions. By testing their acute toxicities in mice, estimating the intravenous dose required to kill-half the mice in a group ($LD_{50}$), it has been found that the sulphomethyl-polymyxins with $LD_{50}$ below about 100 mg./kg. body weight cause undesirable pain on injection, and those with $LD_{50}$ above about 250 mg./kg. body weight have undesirably low antibacterial activity, requiring a needlessly increased dose level.

In addition it has been found that if the $LD_{50}$ value is higher than this optimum range, a substantial proportion of the sulphomethyl derivative is excreted by the kidney within a few hours of administration. Apparently the higher the $LD_{50}$ value, the slower is the conversion of the easily excretable sulphomethyl-polymyxin into polymyxin base, which is extremely slowly excreted.

For parenteral administration it is therefore desirable to have a sulphomethyl-polymyxin with $LD_{50}$ (intravenous in mice) between about 100 and about 250 mg./kg. body weight. The sulphomethyl-polymyxin in the dry state should maintain this $LD_{50}$ for long periods of time, and should be capable of dissolving in water to give a nearly neutral and reasonable stable solution.

It has been found that a sulphomethyl-polymyxin of the desired quality can consistently be obtained by carefully attending to the reaction conditions during its production, particularly in the reaction of the polymyxin formaldehyde derivative with bisulphite.

The reaction of the polymyxin salt with formaldehyde should take place under nearly neutral conditions, preferably at a pH between about 6.6 and about 6.8 using a buffer system effective at this pH. Such conditions are conveniently achieved by mixing solutions of the polymyxin salt and formaldehyde with a 2 N alkali metal hydrogen carbonate/carbonate buffer system of pH 8.5, when the acid released by the reaction brings the pH down to the desired value. An alkali metal hydrogen carbonate alone can be used, but it gives a pH somewhat below the preferred value. The use of an alkali metal hydroxide as described in United States patent specification 2,599,950 and Japanese patent specification 4898/57 is not satisfactory, as it gives too high a pH and leads ultimately to a sulphomethyl-polymyxin with undesirably low antibacterial activity.

In the next stage of the reaction, the polymyxin formaldehyde derivative should be treated with an excess of bisulphite; it is not satisfactory to use the calculated equivalent amount or the minimum amount required to bring it into solution, as described in United States patent specifications 2,599,950 and 3,044,934 and Japanese patent specification 4898/57. Preferably one uses about 1.2 equiva'ents of bisulphite per equivalent of the polymyxin formaldehyde derivative. The pH of the reaction mixture needs to be carefully controlled; it should be continually checked and maintained between 6.4 and 6.7, preferably at about 6.6. The pH can conveniently be kept at this value by adding further small quantities of the bisulphite.

At this stage, ageing of the product in solution is required if a sulphomethyl-polymyxin with the desired properties is to be obtained. It has been found that the ageing process can be followed empirically by observing the behaviour of samples brought to pH 5.0; ageing is complete when a sample no longer yields a precipitate. The ageing process can also be followed by observing the pH of the solution; ageing is complete when the pH has risen to between 7.3 and 7.5. The time required is related inversely to the temperature; conveniently the solution is warmed to about 50–55° C. for about 30 minutes, but a longer time at a lower temperature may be also used. Freeze-drying of the solution when the ageing process is complete yields a sulphomethyl-polymyxin of the desired quality.

According to the invention, therefore, there is provided a salt of a sulphomethyl derivative of polymyxin, characterised in that the salt has a $LD_{50}$ (intravenous in mice) value between 100 mg./kg. and about 250 mg./kg. body weight, and is soluble in water to give a so'ution of pH between 7.3 and 8.0, which solution forms no precipitate if acidified to pH 5.0.

There is further provided a method for producing a sulphomethyl derivative of polymyxin with these properties, in which a water soluble salt of the corresponding polymyxin is treated with formaldehyde in an aqueous solution under nearly neutral conditions, preferably at a pH between 6.6 and about 6.8, the precipitate formed thereby is brought into solution with about 1.2 equivalents of a bisulphite at a pH between 6.4 and 6.7, the solution is kept until the pH has risen to a pH between 7.3 and 7.5 and a sample no longer forms a precipitate when acidified to pH 5.0, and the remainder of the solution is then freeze-dried without delay to recover the product.

The antibacterial activity of the sulphomethyl-polymyxin is due to the polypeptide, and the nature of the cation associated with the anionic sulphomethyl-amino groups is immaterial provided it is therapeutically and pharmacologically acceptable. Suitable cations include sodium and potassium. The use of sodium bisulphite in the method of the invention leads directly to the production of the sodium sulphomethyl-polymyxin.

Though this novel type of sulphomethyl-polymyxin provided by the invention is primarily advantageous for parenteral use, its reliable and standard characteristics render it suitable for oral or topical uses as well.

A phermaceutically acceptable salt of the sulphomethyl-polymyxin may advantageously be presented in discrete units suitable for parenteral or oral administration, or may be presented in a vehicle suitable for oral or topical administration and having a predetermined concentration of the active substance.

For parenteral administration sterile ampules or bottles containing a dosage between 0.2 and 0.8 megaunit of sulphomethyl-polymyxin salt may conveniently be used. For oral administration tablets having a dosage around 0.5 megaunit are usually suitable, but solutions may also be prepared. For topical administration lotions, based on oil-in-water emulsions, or ointments, having a predetermined concentration around 10 kilounits/g. and containing also other antibiotics or agents such as neomycin, hydrocortisone or zinc-bacitracin, may also be prepared. For opthalmic use sterile solutions and ointments are prepared. Sulphomethyl-polymyxins may also be incorporated in lozenges, and may be used in sprays and aerosols for inhalations.

The following examples illustrate the invention.

*Example 1.—Sodium sulphomethyl-polymyxin B*

Stage 1.—Aqueous 30% w./v. formaldehyde solution (200 ml.), previously brought to pH 7.0 by addition of saturated aqueous sodium bicarbonate solution, was added in one lot with vigorous stirring to a solution of polymyxin B neutral sulphate (200 g., 0.138 mole, 0.691 equivalent) in water (2000 ml.), followed immediately by saturated aqueous sodium hydrogen carbonate solution (1000 ml.), previously buffered to pH 8.5 by addition of solid sodium carbonate. The frothing was controlled by the addition of water (1000 ml.). The flocculent precipitate was filtered off and washed with water and dried as thoroughly as possible on the filter plate.

Stage 2.—Whilst still moist, the above precipitate was suspended in water (900 ml.) and stirred vigorously until a thick paste was obtained. A solution of sodium metabisulphite (96.6%; 81 g., 0.412 mole, 0.824 equivalent) in water (100 ml.) was added to this paste over a period of 5 minutes. After a further 5 minutes the mixture became quite mobile and then rapidly gave a clear solution. From the time the mixture became mobile, the pH was constantly checked by means of a pH meter and was maintained between 6.4 and 6.7 (preferably at 6.6) by the occasional addition of small amounts of the sodium metabisulphite solution. After a total time of reaction of 30 minutes at about 20° C., the stirring was stopped.

At the end of this stage it was found that the addition of 0.04 M acetate buffer pH 5.0 (0.8 ml.) to a portion (0.2 ml.) of the solution produced a copious precipitate. Similarly any attempt to lower the pH by addition of mineral acid produced a precipitate. Moreover, freeze-drying at this stage resulted in a product with $LD_{50}$ well below 100 mg./kg. which caused pain on injection.

Stage 3.—Immediately following Stage 2, the solution was heated for a total of 30 minutes to 55° C. by immersing the reaction vessel in a constant temperature bath. At intervals samples were taken and the amount of precipitate formed on addition of acetate buffer as described above was noted. Samples taken after 15 to 20 minutes no longer formed a precipitate. The solution was rapidly cooled and immediately freeze-dried. The product was a granular white powder. Its 2% aqueous solution had a pH between 7.5 and 8.0, and formed no precipitate if acidified to pH 5.0.

The bulk freeze-dried product was assayed, and dissolved in sufficient water to give 0.25 megaunit/ml. The solution was Seitz-filtered, filled in 2 ml. amounts into 15 ml. ampoules, and freeze-dried, with secondary drying over phosphorus pentoxide to reduce the water content to less than 2%.

The properties of several batches prepared as described above are shown in the following table.

SODIUM SULPHOMETHYL-POLYMYXIN B SOLUTION IN WATER AT 22.8 MG./KG.

|   | Fresh | | After 24 hr. at 37° | |
|---|---|---|---|---|
|   | pH | $LD_{50}$ (95% confidence limits) | pH | $LD_{50}$ (95% confidence limits) |
| 1 | 7.90 | 172 (142–202) | 8.5 | 191 (169–225) |
| 2 | 7.65 | 135 (112–165) | 8.4 | 127 (112–150) |
| 3 | 7.75 | 150 (127–165) | 8.5 | 172 (142–202) |
| 4 | 7.60 | 115 (95–135) | 8.4 | 180 (157–214) |
| 5 | 7.65 | 150 (127–165) | 8.5 | 150 (112–165) |

The above table shows that each of these products was reasonably stable; even after 24 hours in solution at 37° C. the $LD_{50}$ was little changed although the pH had risen somewhat.

The change in the properties of a single batch during the ageing process is illustrated in the following table. During ageing of the solution from Stage 2, samples were freeze-dried for toxicity testing, and the pH of the solution and its behaviour at pH 5.0 were observed at the time of sampling.

| Ageing | pH | Precipitate at pH 5.0 | $LD_{50}$ (95% confidence limits) |
|---|---|---|---|
| None | 6.7 | ++ | 54 (47–64) |
| 15 min. at 55° | 7.1 | + | 100 (85–110) |
| 30 min. at 55° | 7.4 | – | 157 (135–187) |
| 60 min. at 55° | 7.6 | – | 236 (202–281) |
| 120 min. at 55° | 7.6 | – | 236 (202–281) |
| 48 hr. at 20° | 7.5 | – | 287 (253–338) |

This table shows that ageing took place in 30 minutes at 55° C. and in less than 48 hours at 20° C. At 55° C., it was more convenient to monitor the ageing process by testing samples at pH 5.0 than by measuring the pH of the solution, but at 20° C. (especially if working on a large scale) the process might be more conveniently monitored by a recording pH meter, stopping when the pH reached 7.4.

*Example 2—Sodium sulphomethyl-polymyxin E*

Aqueous 30% w./v. formaldehyde solution (75 ml.), previously brought to pH 7.0 by addition of saturated aqueous sodium hydrogen carbonate solution, was added to a solution of polymyxin E neutral sulphate (75 g.) in water (750 ml.), followed immediately by saturated aqueous sodium hydrogen carbonate solution (375 ml.), previously brought to pH 8.5 by addition of solid carbonate. The frothing was controlled by addition of water (375 ml.). The precipitate was filtered off and washed with water and dried as thoroughly as possible on the filter plate.

Whilst still moist, the above precipitate was suspended in water (300 ml.) and stirred vigorously. To the paste was added, over a period of 5 minutes, a solution of sodium metabisulphite (30 g.) in water (50 ml.). A clear solution was rapidly obtained and the pH was maintained at 6.6 by addition of small amounts of the sodium bisulphite solution.

After a total reaction time of 30 minutes, the solution was heated to 55° C. for 30 minutes. The solution then gave no precipitate at pH 5.0, and was freeze-dried to give a granular powder having a pH 7.5 to 8.0 in 2% aqueous solution. The properties of two batches prepared as described above are shown in the following table.

SODIUM SULPHOMETHYL-POLYMYXIN E SOLUTION IN WATER AT 22.8 MG./ML.

| pH | Fresh LD$_{50}$ (95% confidence limits) | pH | After 24 hrs. at 37° LD$_{50}$ (95% confidence limits) |
|---|---|---|---|
| 7.4 | 157 (135–187) | 8.25 | 236 (202–281) |
| 7.7 | 150 (127–165) | 8.5 | 191 (169–225) |

*Example 3—Sodium sulphomethyl-colistin*

A similar product was obtained in the same way from colistin sulphate.

What we claim is:

1. A method for producing a sodium salt of a sulphite methyl derivative of a member of a group consisting of a polymyxin B and E, comprising the steps of treating a water soluble neutral salt of the polymyxin with formaldehyde in an aqueous solution under nearly neutral conditions, preferably at a pH between 6.6 and 6.8, bringing the precipitate formed thereby into solution with about 1.2 equivalent of sodium bisulphite at a pH between 6.4 and 6.7, maintaining the solution until the pH has risen to a pH between 7.3 and 7.5 and a sample no longer forms a precipitate when acidified to pH 5.0, and then freeze-drying the remainder of the solution without delay to recover the product.

2. A method according to claim 1, in which a potassium salt product is recovered.

3. A method according to claim 1, in which a hydrochloride salt of the polymyxin is treated with formaldehyde.

4. A method according to claim 1, in which a sulphate salt of the polymyxin is treated with formaldehyde.

5. A method according to claim 1, in which colistin sulphate is treated with formaldehyde.

6. A method according to claim 1, in which an aqueous alkali hydrogencarbonate/carbonate buffer system of a strength of about 2 N is employed in the treatment with formaldehyde.

References Cited by the Examiner

UNITED STATES PATENTS 2,599,950  6/1952  Stansly et al. _____ 195—96
3,044,934  7/1962  Wilkinson _____ 167—65
3,228,836  1/1966  Anschel et al. _____ 167—65

OTHER REFERENCES

Stansly et al., "Polymyxin: A New Chemotherapeutic Agent," Bull. Johns Hopkins Hosp. 81 (1) 43–54 July 1947.

Chem Abstracts 52: P18357d (1958).

Schwartz et al., "Microbiological and Pharmacological Studies of Colistin Sulfate and Sodium Colistinmethanesulfonate," Antibiotics Annual 1959–1960, pp. 41–60 (1960).

Wright et al., "Chemical, Biological, and Clinical Observations on Colistin," Antibiotics Annual 1959–1960, pp. 61–74 (1960).

Sous et al., "Antibiotic Action and Toxicity of the Antibiotic Colistin," Arzneimettel-Forsch 11:395–400 (1961).

Girerd et al., "Acute effect of three antibiotics on diuresis in the rat," Nature 190 (4775) p. 536 May 6, 1961.

Clifford et al., "Intraventricular Administration of a New Derivative of Polymyxin B in Meningitis due to Ps. Pyocyanea," Lancet July 22, 1961, pp. 177–180.

Lancet Aug. 12, 1961, pp. 352–353.

Giroux et al., "Acute Toxicity of Sodium Colistinmethanesulfonate in the Mouse and Rat," Trav. Soc. Pharm. Montpelier 22:49–54 (1962).

Wilkinson "Identity of Colistin and Polymyxin E," Lancet Apr. 27, 1963, pp. 922–923.

Wilkinson et al., "The Identities of the Antibiotics Colistin and Polymyxin E," J. Chem. Soc. November 1964, pp. 4107–4125.

LEWIS GOTTS, *Primary Examiner.*

S. K. ROSE, *Assistant Examiner.*